United States Patent Office 3,531,331
Patented Sept. 29, 1970

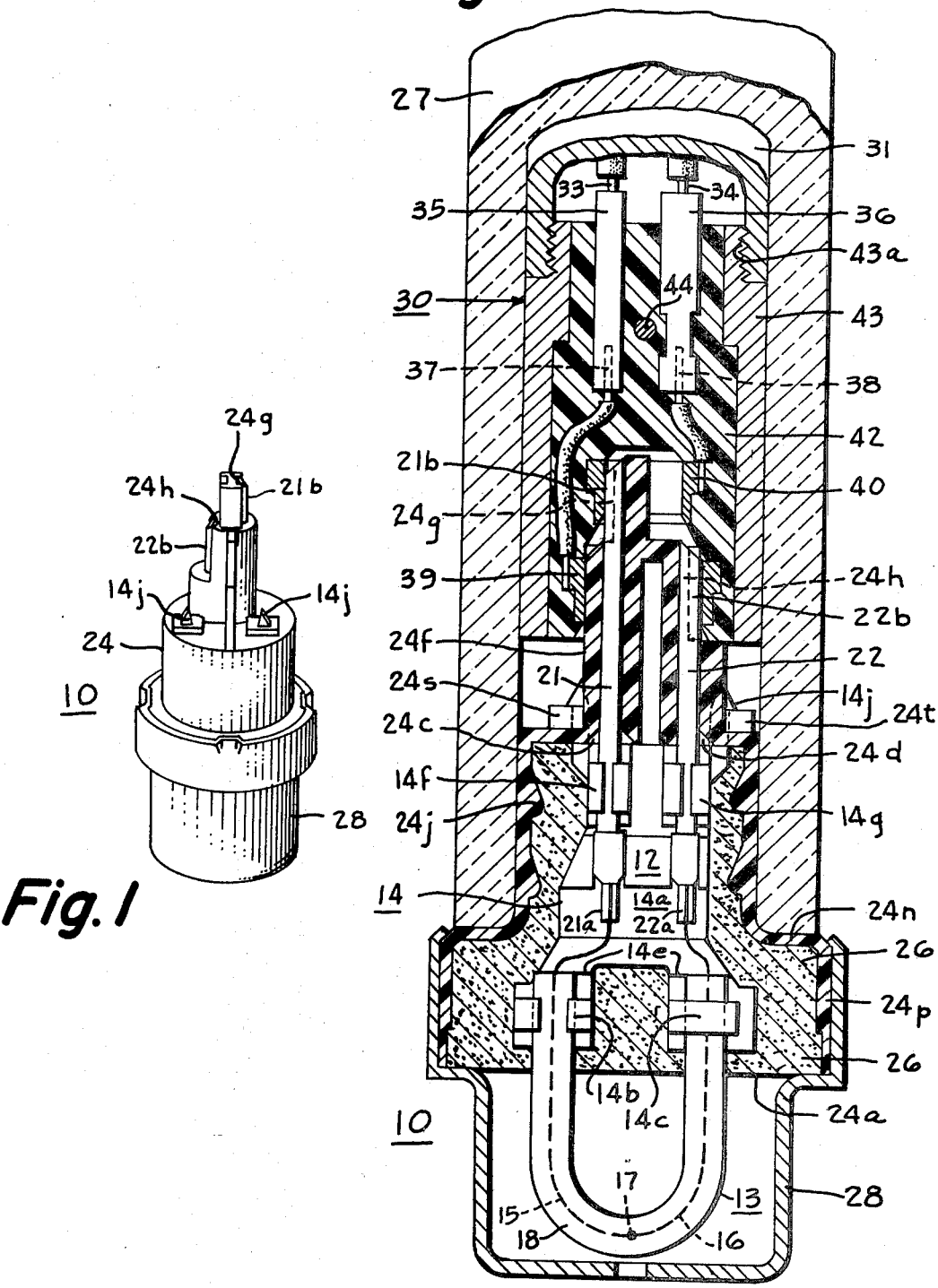

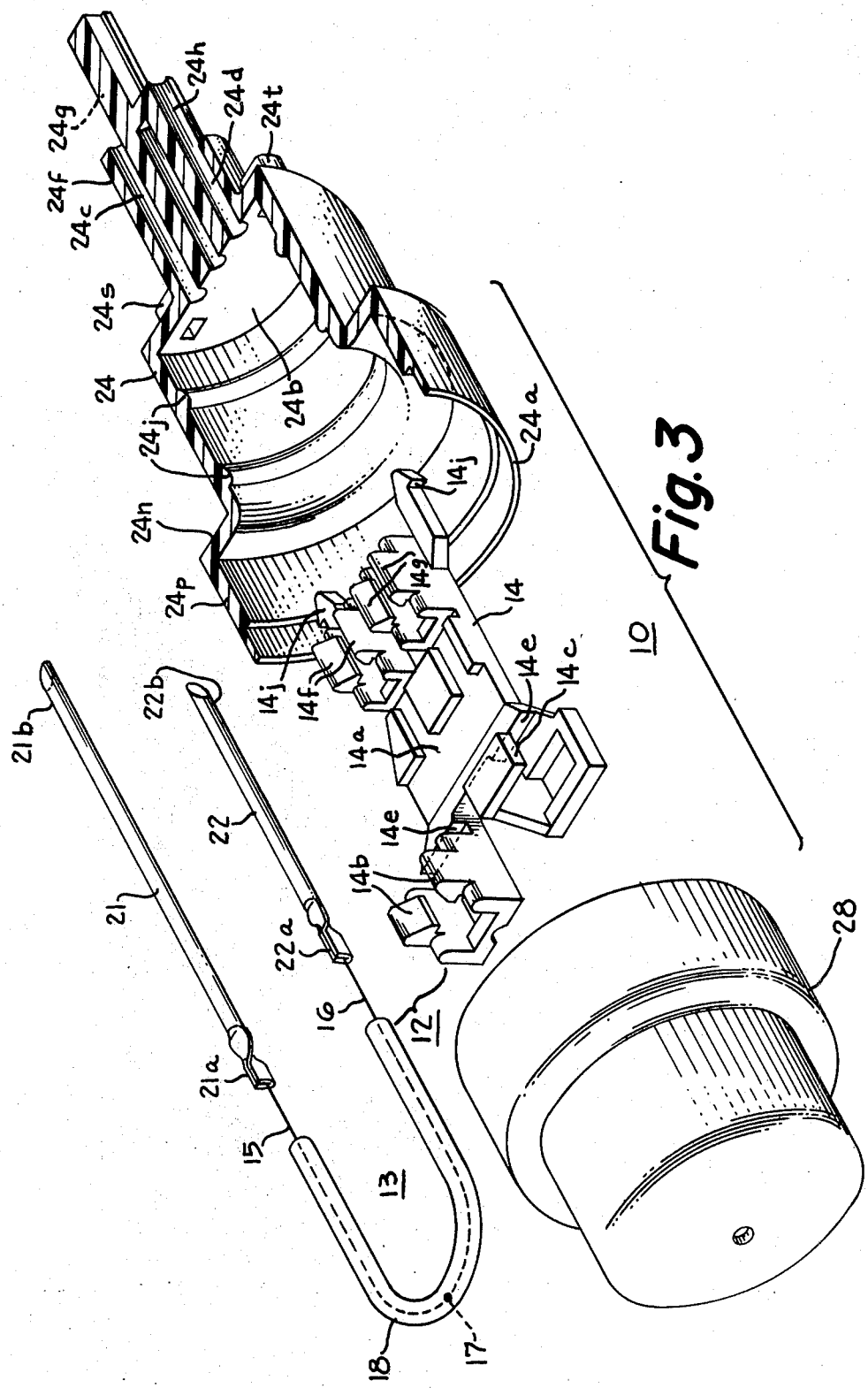

3,531,331
EXPENDABLE IMMERSION TEMPERATURE RESPONSIVE UNIT AND HEAT-SENSING ASSEMBLY THEREFOR
Roy E. Davies, Roslyn, Pa., assignor to Leeds & Northrup Company, Philadelphia, Pa., a corporation of Pennsylvania
Filed Feb. 23, 1966, Ser. No. 529,533
Int. Cl. H01v 1/04, 1/10
U.S. Cl. 136—234                 7 Claims

ABSTRACT OF THE DISCLOSURE

An improved heat-sensing assembly which includes a support for the heat-sensing element and its electrical contacts and preferably is provided as a sub-assembly during the manufacture of the expendable immersion temperature responsive units.

---

This invention relates to expendable immersion temperature responsive units and has for an object the provision of an improved heat-sensing assembly which includes a support for the heat-sensing element and its electrical contacts and preferably is provided as a sub-assembly during the manufacture of the expendable immersion temperature responsive units. The invention relates to improvements in expendable immersion thermocouple units of the types disclosed in Mead Pat. No. 2,999,121 and Davies application, Ser. No. 193,706, filed May 10, 1962, issued Jan. 17, 1967 as Pat. No. 3,298,874.

In the Mead patent there was disclosed an expendable prefabricated thermocouple unit which may be easily and rapidly connected for making immersion temperature measurements such, for example, as the temperature of molten metal in open hearth furnaces. After immersion in the bath of molten metal and the taking of a temperature measurement, the unit is discarded and replaced by another similar precalibrated unit. In the aforesaid Davies application there was disclosed a housing for the temperature responsive unit, which housing provided a support for the temperature responsive device to hold the latter in place preparatory to sealing the device to the unit with refractory cement. Such construction assured the uniform positioning of the temperature responsive device or heat-sensing element during manufacture of the expendable immersion temperature responsive unit. The present invention not only retains the desirable features of the aforesaid Davies application, but in addition provides a sub-assembly construction for the heat-sensing assembly, which provides support not only for the heat-sensing element, but also for the electrical contacts thereof, thereby minimizing damage to the electrical circuit of the heat-sensing element during manufacture of the expendable immersion temperature responsive units. The present invention also has a number of additional and desirable features as hereinafter described.

In accordance with one aspect of the present invention, there is provided for use in an expendable immersion temperature responsive unit, a heat-sensing assembly comprising a heat-sensing element encased in a heat-transmitting electrically insulating refractory material and having a pair of electrical conductors extending therefrom. This assembly also includes as a component thereof a support member including a substantially flat body portion having at one end thereof first gripping structure including upstanding flexible wall structure in gripping relation with the refractory material. The body portion also is provided with second gripping structure adjacent the other end thereof for gripping the electrical conductors. The second gripping structure comprises upstanding flexible side walls defining spaced grooves, the bottoms of which extend longitudinally of the body portion. The electrical conductors have lengths sufficient to extend beyond the other end of the body portion to provide electrical contacts for the expendable immersion temperature responsive unit. The electrical conductors which may form part of the heat-sensing element, or are of different material, are electrically connected to the electrical contacts at locations intermediate the first and second gripping structures.

In the preferred form of the invention, the heat-sensing element comprises a thermocouple joined to a pair of electrical conductors of compensating lead wire material, which provide electrical contacts. By constructing the support member with a substantially flat body portion from one side of which extend the spaced first and second gripping structures, the electrical contacts which are relatively heavy and the heat-sensing element for the expendable immersion temperature responsive unit are readily assembled during the manufacture of the unit. Thereafter, the gripping structures securely hold in place the heat-sensing element and the electrical contacts, thereby minimizing relative movement therebetween after the the connection has been made to prevent damage to the very fine gauge wires of the heat sensing element. The body portion of the support member includes stop structure extending transversely of the support member and intermediate the first and second gripping structures. The stop structure is adapted to engage the refractory material encasing the heat-sensing element so as to limit the position of the heat-sensing element relative to the support member. In constructing an expendable temperature responsive unit according to the present invention, the above described heat-sensing assembly is placed in a cup having an open end and a closed end. The cup has a depth related to the length of the support member, so that when the end of the body portion thereof adjacent the second gripping structure is in engagement with the inner surface of the closed end of the cup, the heat-sensing element projects out of the open end of the cup a desired distance. The cup at the closed end thereof is provided with a pair of passages through which the electrical contacts extend. The cup at the outer surface of the closed end thereof is provided with an exterior resilient projection extending longitudinally of the cup. The projection is provided with spaced groove structure in alignment with the passages in the closed end of the cup to receive the electrical contacts and to provide support therefor, thus making it possible to use shorter lengths of lead wire and eliminate a bending operation formerly required to secure the contacts in place. This in turn further reduces the cost of the completed unit. The support member at the end thereof opposite the end with the first gripping structure may additionally be provided with locking structure for cooperating with the cup to hold the heat-sensing assembly in the cup prior to filling the cup with electrical insulating material.

For further objects of the invention, reference may be had to the following description taken in conjunction with the accompanying drawings, in which:

FIG. 1 is a perspective view of a temperature responsive unit embodying the present invention;

FIG. 2 is a cross sectional view of the unit shown in

FIG. 1 inserted in the end of a tube of heat insulating material and with the electrical contacts of the unit in engagement with corresponding electrical contacts of a manipulator; and FIG. 3 is an exploded perspective view partly in section of the heat-sensing assembly and cup of FIG. 2.

Referring to FIG. 1, there is shown an expendable immersion temperature responsive unit 10 of the type utilizing the present invention. As may be seen in FIGS. 2 and 3, the unit 10 includes a sub-assembly in the form of a heat-sensing assembly 12 as now to be described. The heat-sensing assembly comprises a heat-sensing element 13 and a support member 14 therefor. The heat-sensing element 13 has been illustrated in the form of a thermocouple, including a pair of serially connected thermocouple wires 15 and 16, wherein the connection forms a hot junction 17. The thermocouple wires 15 and 16 and hot junction 17 are encased in heat-transmitting electrically insulating refractory material which may take the form of a bent quartz tube 18. A heat-sensing element of this type is disclosed in the aforesaid Mead Pat. No. 2,999,121.

The support member 14 includes a substantially flat body portion 14a, having at one end thereof first gripping structure including spaced upstanding flexible wall structure 14b, 14b in gripping relation with one leg of the bent quartz tube 18. The flexible walls 14b are so constructed and arranged to snap into gripping relation with one leg of the tube 18 when the latter is pressed between the flexible walls 14b, 14b. It will be noted that the flexible walls 14b extend substantially perpendicular to the flat body portion 14a of the support member 14. The other leg of the tube 18 is adapted to be held against the support member 14 by means of a right angle structure 14c, one section of which is parallel to the body portion 14a and the other section of which is secured to the body portion 14a at a location between the legs of the tube 18. With this construction, the flexible walls 14b, 14b cooperate to hold one leg of the tube 18 against movement of the tube 18 transversely of the support member 14 while the right angle section 14c prevents the tube 18 from rotating out of a plane substantially parallel to the plane of the support member. The right angle section 14c is open at the outer end thereof, thereby permitting a substantial tolerance in the spacing between the legs of the tube 18 without danger of cracking the tube when inserting it in the gripping structure on the support member. The support member 14 also includes a raised shoulder 14e providing stop structure extending transversely of the support member 14. As may be seen in FIG. 2, the stop structure 14e is carried by the body portion 14a of the support member 14 at a location above the gripping structure 14b and 14c and is adapted to engage the ends of the tube 18 encasing the thermocouple so as to limit the position of the hot junction 17 relative to the support member 14.

The support member 14 adjacent the opposite end thereof is provided with second gripping structure comprising two pairs of spaced upstanding flexible side walls 14f, 14f and 14g, 14g which extend substantially perpendicular to the flat body portion 14a and are adapted to grip electrical conductors 21 and 22 which are electrically connected to the thermocouple wires 15 and 16, respectively. The electrical conductors 21 and 22 preferably comprise compensating lead wire material and have their inner ends flattened so that they may be crimped-connected at 21a and 22a to the adjacent ends of the respective thermocouple wires 15 and 16. As may be seen in FIG. 2, the flexible side walls 14f, 14f and 14g, 14g define spaced grooves, the bottoms of which extend longitudinally of the body portion 14a and are adapted to receive, respectively, the electrical conductors 21 and 22. The electrical conductors 21 and 22 have lengths sufficient to extend beyond the adjacent end of the body portion 14a to provide electrical contacts 21b and 22b for the expendable immersion temperature responsive unit 10, as later to be described.

The heat-sensing assembly 12 comprises a sub-assembly which is adapted to be inserted in a cup 24 having an open end 24a and a closed end 24b. The closed end 24b of the cup 24 is provided with a pair of passages 24c and 24d through which the electrical conductors 21 and 22, respectively, extend. The cup 24 has a depth related to the length of the support member 14 so that when the end of the body portion 14a adjacent the second gripping structure 14f–14g is in engagement with the inner surface of the closed end 24b of the cup 24, the heat-sensing element including the thermocouple junction 17 projects out of the open end 24a of the cup 24 a predetermined distance. The outer surface of the closed end 24b of the cup 24 is provided with an exterior resilient projection 24f extending longitudinally of the cup 24. The projection 24f is provided with passages which terminate in groove structures 24g and 24h in alignment with the passages 24c and 24d in the closed end of the cup 24. The groove structures 24g and 24h are open at the sides thereof opposite the central axis of the extension 24f so as to expose a portion of the surface of the electrical contacts 21b and 22b, respectively. The portion of projection 24f beneath the contacts provides resilient backup support therefor. This construction is advantageous, since it permits the use of wire elements for the contacts which are shorter than those used heretofore.

The electrical conductors 21 and 22 extending through the corresponding passages 24c and 24d cooperate to maintain the heat-sensing assembly 12 in a central position within the cup 24. The heat-sensing assembly 12 is adapted to be sealed within the cup 24 by means of a refractory cement which has both heat insulating and electrical insulating characteristics and is adapted to be poured into the open end of the cup 24 until the cup is filled. The cement 26, when hardened, forms a rigid body having electrical and heat insulating properties and is adapted to be retained in the cup 24 by means of inwardly extending protuberances 24j which extend around the inner circumference of the cup 24. The refractory cement 26 may be any of the various suitable cements known to those skilled in the art.

The open end 24a of the cup 24 is provided with a flange 24n and a rim 24p. The flange 24n is adapted to abut against the end of a heat insulating tube 27, which preferably is made from hard paper or equivalent material, as shown in FIG. 2. A protective cap 28 is adapted to surround the outwardly projecting portion of the refractory encased thermocouple 15–18 with the cap 28 being secured to the combined flange 24n and rim 24p of the cup 24. This flange and rim construction is similar to the construction disclosed in the aforesaid Davies application and the protective cap 28 is of the type disclosed in the aforesaid Mead patent and preferably is made from a thin metal material so that it will melt or be consumed rapidly during immersion in a molten bath, the temperature of which is being measured.

Although the temperatures which are being measured frequently are in the order of 3,000° F. and above, the cup 24 may be made from a plastic material having a substantially lower melting point. As pointed out in the aforesaid Davies application, the reason for this is the fact that the heat insulating tube 27 insulates the plastic cup 24 from the molten bath for the short period of time required for the thermocouple to obtain a temperature measurement. Cooperating with the heat insulating tube 21 is the refractory cement 26 which fills the cup 24. Various plastic materials may be used for the cup 24 such as nylon, polyethylene and Bakelite; however, applicant prefers to use a high impact polystyrene because of its mechanical strength, ease of molding and low cost. It is also to be understood that other plastic materials may be used. The support member 14 for the heat-sensing assembly may also be made of plastic material such as mentioned above and preferably is made from high impact polystyrene.

As may be seen in FIG. 2, the expendable temperature responsive unit 10 is adapted to be plugged in at the lower end of a manipulator 30. The manipulator 30 has contacts of the non-directional type similar to those disclosed in Moore Pat. 3,024,295 and Parker Pat. 3,048,642. The manipultaor 30 may be of any desired length, but is generally in the order of eight feet long and is made up of a pipe section 31 which is threaded at its ends and adapted to be joined with a contact housing at one end and a handle including a plug connector at the other end. The outer end of the manipulator 30, which is adapted to be held by the operator, preferably by the handle, includes an electrical cable comprising extension lead wires 33 and 34. The lead wires 33 and 34 may be, depending upon the material of the heat-sensing element, of compensating lead wire material of the type well known in the art and are insulated from each other throughout their length. The outer ends of the lead wires 33 and 34 are adapted to be connected to a temperature measuring system. Such systems are well known in the art and it is not believed necessary to illustrate them here.

The lower ends of the lead wires 33 and 34 are connected to crimp-type connectors 35 and 36 of corresponding compensating lead wire material. The lower ends of the connectors 35 and 36 are respectively connected by conductors 37 and 38 to ring contacts 39 and 40, which are also respectively made of compensating material. As may be seen in FIG. 2, the connectors 35 and 36, the conductors 37 and 38 and the ring contacts 39 and 40 are all adapted to be molded in a resilient or rubber contact block 42. The contact block 42 is adapted to be positioned in a housing 43, the upper end of which is threaded at 43a so as to engage the threaded end 31a on member 31. The contact block 42 is adapted to be secured in place within the coupling 43 by means of a cross pin 44.

As may be seen in FIG. 2, the contact rings 40 and 39 carried by the manipulator 30, are coaxial, similar to the contact rings on the manipulator shown in FIG. 8 of the aforesaid Parker Pat. 3,048,642. However, the contact rings 39 and 40 have different diameters, as shown in FIG. 5 of Moore Pat. 3,024,295. The contact ring 40 is adapted to engage the contact 21b of the temperature responsive unit 10, while the contact ring 39 is adapted to engage the contact 22b. It will be noted in FIG. 2 that the contacts 21b and 22b comprise straight portions of the conductors 21 and 22, rather than bent back portions, as disclosed in the aforesaid Parker patent, thereby shortening the length of electrical conductors required for making such contacts and likewise eliminating a bending operation formerly required to secure them. In order to further minimize the cost of the tempearture responsive units 10, it is desirable to use as small a size of thermocouple wires 15 and 16 as possible. In praxtive, these wires have been as small as .0031" diameter (No. 40 B & S gauge) and thus are quite fragile and rather difficult to handle. By utilizing a support member including a substantially flat body portion 14a, such as shown in FIGS. 2 and 3, with gripping structures for both the electrical conductors 21 and 22 and the tube 18, the electrical connections between the conductors 21, 22 and the thermocouple wires can be readily installed and the connections and the fine wires are prevented from being damaged due to the spaced gripping structures on the support member 14 holding the parts firm with respect to each other. Such construction facilitates the manufacture of the temperature responsive units 10 and minimizes defective units.

When it is desired to handle the temperature responsive units 10 before filling the cups 24 with the refractory cement 26, the support member 14 may be provided at the inner end thereof with locking structure in the form of hooks 14j, which are adapted to extend through openings in the bottom of the cup 24b, which are spaced to one side of the openings 24c and 24d and are provided with projecting shoulders 24s and 24t, which cooperate with the hooks 14j to hold the heat-sensing assembly 12 in the cup 24 prior to filling the cup with electrical insulating material 26.

While a preferred embodiment of the invention has been described and illustarted, it is to be understood that further changes and modifications may be made within the scope of the appended claims.

What is claimed is:

1. For use in an expendable immersion temperature responsive unit, a heat-sensing assembly comprising a heat-sensing element encased in a heat transmitting electrically insulating refractory material and having a pair of electrical conductors extending therefrom, and a support member including a substantially flat body portion having at one end thereof first gripping structure including up-standing flexible wall structure in gripping relation with said refractory material for supporting said heat-sensing element encased therein, said body portion having second gripping structure adjacent the other end thereof gripping said electrical conductors, said second gripping structure comprising up-standing flexible side walls defining spaced grooves, the bottoms of which extend longitudinally of said body portion, said electrical conductors having lengths sufficient to extend beyond said other end of said body portion to provide electrical contacts for the expendable immersion temperature responsive unit, whereby said support member supports both said heat-sensing element and said electrical contacts.

2. A heat-sensing assembly according to claim 1 wherein said lengths of electrical conductors which provide said electrical contacts are electrically connected to said heat-sensing element at locations intermediate said first and second gripping structures.

3. A heat-sensing assembly according to claim 2 wherein said heat-sensing element comprises a thermocouple and said lengths of electrical conductors which provide said electrical contacts comprise compensating lead wire material.

4. A heat-sensing assembly according to claim 1 wherein said body portion of said support member includes stop structure extending transversely of said support member and intermediate said first and second gripping structures, said stop structure being adapted to engage said refractory material encasing said heat-sensing element so as to limit the position of said heat-sensing element relative to said support member.

5. In an expendable temperature responsive unit, the combination of a heat-sensing assembly comprising a heat-sensing element encased in a heat transmitting electrically insulating refractory material and having a pair of electrical conductors extending therefrom, and a support member including a substantially flat body portion having at one end thereof first gripping structure including up-standing flexible wall structure in gripping relation with said refractory material, said body portion having second gripping structure adjacent the other end thereof gripping said electrical conductors, said second gripping structure comprising up-standing flexible side walls defining spaced grooves, the bottoms of which extend longitudinally of said body portion, said electrical conductors having lengths sufficient to extend beyond said other end of said body portion to provide electrical contacts for the expendable immersion temperature responsive unit, and a cup having an open end and a closed end, said cup having a depth related to the length of said support member so that when the end of said body portion adjacent said second gripping structure is in engagement with the inner surface of the closed end of said cup said heat-sensing element projects out of the open end of said cup a predetermined distance, said cup at the closed end thereof having a pair of passages through which said electrical contacts extend.

6. The combination of claim 5 wherein said cup at the outer surface of the closed end thereof is provided with an exterior resilient projection extending longitudinally of said cup, said projection having groove structure in alignment with said passages in the closed end of said cup to receive said electrical contacts and provide support therefor.

7. The combination of claim 5 wherein said support member at the end thereof opposite said end with said first gripping structure is provided with locking structure for cooperating with said cup to hold said heat-sensing assembly in said cup prior to filling said cup with electrical insulating material.

References Cited

UNITED STATES PATENTS

| | | | |
|---|---|---|---|
| 846,998 | 3/1907 | Hammond | 73—359 X |
| 2,466,202 | 4/1949 | Brenner | 136—236 X |
| 3,181,974 | 5/1965 | Barbera | 136—173 |
| 2,732,416 | 1/1956 | Robertson | 136—234 |
| 3,024,295 | 3/1962 | Moore | 136—234 |
| 3,294,592 | 12/1966 | Fish et al. | 136—234 |
| 3,298,874 | 1/1967 | Davies | 136—242 |

WINSTON A. DOUGLAS, Primary Examiner

M. J. ANDREWS, Assistant Examiner

U.S. Cl. X.R.

136—235